UNITED STATES PATENT OFFICE 2,571,752

SEPARATION OF OIL FROM WAX

Walter V. Overbaugh, Fishkill, N. Y., assignor to The Texas Company, New York, N. Y., a corporation of Delaware No Drawing. Application May 28, 1948, Serial No. 29,949

7 Claims. (Cl. 196—20)

This invention relates to the separation of oil from wax and more particularly to the separation of oil from wax concentrates for the production of wax.

The invention involves crystallization of the wax from the oil and filtration of the crystallized wax therefrom in the presence of a solvent liquid by continuous filtration obtaining a filter cake of wax which is washed in situ with additional solvent liquid and subsequently discharged from the filter.

In accordance with this invention the aforesaid crystallization is effected in the presence of a quantity of added oil of relatively higher viscosity than the oil contained in the wax concentrate or in the wax-oil feed mixture, the quantity so added usually being in minor proportion relative to the volume of wax concentrate.

The invention has application to the treatment of wax concentrates containing a small amount of oil, for example, in the range about 5-20% by volume of the concentrate and especially such concentrates as are obtained in the dewaxing of distillate wax-bearing lubricating oil stocks. Wax-oil mixtures containing up to 50% oil may also be treated effectively by this invention.

As disclosed in U. S. Patent 2,229,658 granted to Vance N. Jenkins, it is advantageous in the separation of oil from wax-oil mixtures by filtration in the presence of a solvent liquid at low temperature to effect initial cooling of the wax-oil solution in the absence of any diluent or in the presence of only a limited amount of such diluent. In other words, the wax-oil solution is cooled in the absence or substantial absence of solvent liquid to a temperature sufficiently low to crystallize a portion of the wax. Thereafter cold solvent is commingled with the oil and crystallized wax and the resulting mixture filtered. Crystallization of the wax in the wax-oil mixture in the absence of solvent liquid or in the presence of a limited amount thereof results in the formation of a wax structure of desirable type for effective filter cake washing in the filter. The patent in question also discloses the possibility of substituting light lubricating oil or gas oil for solvent or diluent in the partial dilution of the wax oil mixture during chilling.

The present invention distinguishes from this prior art by adding to or incorporating in the wax concentrate, oil which is relatively more viscous than that naturally present in the concentrate. One important advantage of adding this heavier oil is that it exerts a beneficial effect upon the wax crystal structure. It has the effect of reducing wax crystal size. It has been observed that the wax crystals formed from the relatively more viscous medium obtained by the addition of the more viscous oil are materially less voluminous and more dense than the crystals formed in the presence of a materially less viscous crystallizing medium such as exists when solvent liquid or gas oil is added to the wax oil mixture.

Increasing the oil content of the feed mixture avoids excessive thickening caused by crystallization of the wax and thus allows the mixture to be reduced to a lower temperature before addition of the solvent liquid. This also results in decreasing the amount of solvent otherwise required during chilling. By employing relatively more viscous oil than that present initially in the wax-oil concentrate excessive thickening is avoided and in addition the wax crystals are more dense and of improved structure so that upon filtration the wax obtained holds up little solvent liquid and oil and washing of the cake in situ is more effective. Better results are thus obtained by maintaining a high viscosity of the crystallizing medium than can be realized by depending merely upon a small amount of solvent liquid or light oil to prevent excessive thickening.

By means of this invention the oil content of the product wax can be reduced by as much as 60 to 80% of that otherwise present in the product obtained by crystallization in the presence of added oil of the same or lower viscosity than the oil normally associated with the wax in the wax concentrate.

Distillate wax-bearing stocks of the type in question have a Saybolt Universal viscosity of about 38-60 seconds at 210° F. In conventional dewaxing operations these distillates are chilled and filtered in the presence of about 2-4 volumes of solvent liquid per volume of distillate at a temperature in the range of about 0 to minus 25° F. to obtain a dewaxed oil having a pour test of 0° F. and lower. The wax cake obtained in these filtering operations comprises a mixture of slack wax and solvent liquid. The solvent liquid is recovered leaving a slack wax or wax concentrate containing about 5 to 20% of oil.

In the practice of my invention a wax concentrate as thus obtained, is commingled with an added oil having a Saybolt Universal viscosity of about 70 to 90 seconds at 210° F. If desired this added oil may be of even higher viscosity, for example, in the range 120 to 160 Saybolt Universal seconds at 210° F. It may be a dewaxed residual lubricating oil or fraction thereof and which is an effective type of oil to use. In other words, it may have a Saybolt Universal viscosity of at least about 30 and as much as 80 or 90 seconds higher than that of the oil present in the concentrate.

The added oil is advantageously wax free and is added to the wax concentrate in the proportion of about 20 to 40% by volume of the concentrate or in such amount as may be necessary in order to provide a sufficiently viscous crystallizing medium to result in the obtaining of the desired wax structure upon cooling to effect crystallization. It is advantageous to add sufficient of the more viscous oil so that the product wax obtained as filter cake will amount to about 60% by volume of the wax and oil in the mixture undergoing filtration.

By way of an example, the wax concentrate obtained by dewaxing an SAE 10 grade distillate lubricating oil stock is mixed with about 10% by volume of oil having a Saybolt Universal viscosity of about 70 seconds at 210° F. The resulting mixture at a temperature of about 140° F. is cooled to a temperature of about 120° F. in the substantial absence of any solvent liquid. The partially cooled mixture is then mixed with about 0.3 volume of dewaxing solvent liquid mixture containing about 50% methylethyl ketone and 50% commercial benzol. The partially diluted mixture is cooled to about 100° F. and then an additional 0.3 volume of solvent cooled to about 100° F. is added. This mixture is chilled to about 80° F. following which another 0.3 volume of solvent separately chilled to 80° F. is added. The temperature is then reduced to 60° F. followed by addition of another 0.3 volume of solvent separately chilled to 60° F. thereafter the temperature is further reduced to about 40° F. followed by the addition of another 0.3 volume of solvent separately chilled to 40° F. This mixture is then chilled to about 15° F. after which it is commingled with 1.5 volumes of solvent separately cooled to 15° F.

The resulting cold mixture comprising about three volumes of solvent and one volume of wax concentrate is then subjected to filtration in a continuous rotary drum vacuum filter of conventional type having provision for washing of the resulting filter cake in situ with additional solvent liquid. Advantageously provision is made for recycling some of the filtrate stream to the cold mixture passing into the filter. The amount so recycled is such as to maintain a ratio of one volume of solid phase to about fifteen to twenty volumes of liquid phase in the mixture undergoing filtration.

The filtrate comprises oil and soft wax dissolved in solvent liquid while the washed filter cake discharged from the filter comprises wax mixed with a small amount of solvent liquid, the solvent-free wax having a melting point of about 125 to 130° F. This washed cake will have an oil content of about 0.1 to 0.2% as contrasted with an oil content of about 0.44% for the cake obtained in a conventional operation using solvent addition only or as contrasted with an oil content of about 0.4 to 0.6% when crystallization is effected in the presence of added gas oil.

The filtering temperatures in the case of wax concentrates obtained from SAE 20 and 40 grade distillates will be approximately 20° F. and 40° F. respectively.

The more viscous added oil is present in the filtrate obtained in the filtering operation. Provision may be made for recovering the solvent contained in this filtrate and the solvent free mixture of added oil and product oil can be distilled to separate the less viscous product oil from the added oil which latter can be recycled for reuse in the process.

While mention has been made of incorporating the more viscous oil prior to cooling nevertheless it is contemplated that in some cases it may be desirable to add it during the initial cooling, such additions being made in small increments if desired.

While specific conditions of temperature, solvent dosage and proportion of added oil have been mentioned nevertheless it is contemplated that these conditions may vary substantially depending upon the nature of the stock undergoing treatment and the type of wax product desired.

It is also contemplated that the invention may have application in the dewaxing of distillate lubricating oil stocks for the production of dewaxed oil. Thus it is possible that in some instances it may be commercially advantageous to incorporate in the distillate stock a small proportion of residual oil so as to obtain an improved crystal structure.

As already intimated, conventional dewaxing solvents may be employed. Thus the solvent liquid used in the operation advantageously comprises a mixture of aliphatic ketone and aromatic hydrocarbon. For example, it may comprise a mixture containing about 30 to 60% methylethyl ketone and 40 to 70% commercial benzol, the latter containing about 25 to 30% by volume of toluol. It will be understood, of course, that other conventional dewaxing solvent liquids or liquid mixtures of conventional wax antisolvents and oil solvents may be employed including normally gaseous and normally liquid type hydrocarbon solvents.

Obviously many modifications and variations of the invention as above set forth may be made without departing from the spirit and scope thereof, and, therefore, only such limitations should be imposed as are indicated in the appended claims.

I claim:

1. In the separation of oil from a feed mixture of relatively low viscosity oil and wax by crystallization of wax, and filtration in the presence of a solvent liquid, said feed mixture being of such character that a wax cake comprising wax crystals of voluminous character and of relatively high oil content normally is formed, the improvement which comprises effecting said crystallization in the presence of a minor proportion of added and substantially wax-free lubricating oil of relatively more viscous character than the oil present in said feed mixture and effective to reduce wax crystal size such that said wax cake is of relatively lower oil content than that obtained by crystallization in the absence of said added oil.

2. The method according to claim 1 in which the more viscous oil is incorporated in the feed mixture prior to addition of at least the main body of solvent liquid.

3. The method according to claim 1 in which the more viscous oil is incorporated in the feed mixture, the resulting mixture thereafter cooled and filtered in the presence of the solvent liquid at a temperature substantially below normal room temperature.

4. The method according to claim 1 in which the added viscous oil amounts to about 10–20% by volume of the feed mixture.

5. In the separation of oil from a wax concentrate obtained in the dewaxing of distillate lubricating oil stocks, by crystallization of wax, and filtration in the presence of a solvent liquid at a temperature substantially below normal room temperature, the resulting wax cake being washed in situ with more solvent liquid, the aforesaid wax cake comprising wax crystals of voluminous character, the improvement which comprises effecting said crystallization in the presence of a minor proportion of added and substantially wax-free lubricating oil relatively more viscous than the oil in said concentrate and effective to reduce the crystal size of said wax.

6. In the separation of oil from a wax concentrate obtained in the dewaxing of distillate lubricating oil stocks having a Saybolt Universal viscosity in the range about 38 to 60 seconds at 210° F., said concentrates containing about 5 to 50% oil by volume, the method which comprises incorporating in said concentrate a small proportion of added and substantially wax-free lubricating oil having a Saybolt Universal viscosity in the range of about 70 to 90 seconds at 210° F. and effective to reduce crystal size of said wax, effecting crystallization of wax from said concentrate, filtering the mixture in the presence of a solvent liquid to obtain a wax cake of relatively low oil content and removing the wax therefrom.

7. The method according to claim 6 in which the more viscous oil amounts to about 10 to 20% by volume of the wax concentrate and is derived from a residual lubricating oil stock.

WALTER V. OVERBAUGH.

REFERENCES CITED

The following references are of record in the file of this patent:

UNITED STATES PATENTS

| Number | Name | Date |
|---|---|---|
| 1,857,404 | Schott | May 10, 1932 |
| 1,927,057 | Anderson | Sept. 19, 1933 |
| 1,963,175 | Quinn | June 19, 1934 |
| 2,027,738 | Lederer | Jan. 14, 1936 |
| 2,142,359 | Lederer et al. | Jan. 3, 1939 |